Patented July 16, 1929.

1,721,317

UNITED STATES PATENT OFFICE.

DONALD G. ROGERS AND HAROLD T. STOWELL, OF BUFFALO, NEW YORK, ASSIGNORS TO NATIONAL ANILINE & CHEMICAL COMPANY, INC., OF NEW YORK, N. Y., A CORPORATION OF NEW YORK.

PROCESS OF MAKING ANTHRAQUINONE-DISULPHONIC ACID.

No Drawing.   Application filed November 21, 1923.   Serial No. 676,162.

This invention relates to improvements in the manufacture and production of anthraquinone-alpha-disulphonic acids.

It has been heretofore proposed to prepare anthraquinone-alpha-alpha-disulphonic acids by the sulphonation of anthraquinone in the presence of mercury or its compounds with oleum containing a comparatively high percentage of free sulfuric anhydride, e. g., about 40 to 44% free sulfuric anhydride; but while this method results in substantially complete sulphonation of the anthraquinone, there is formed a complex mixture containing, in addition to the alpha-alpha-disulphonic acids, lesser proportions of the alpha-monosulphonic acid and of the alpha-beta and beta-beta-disulphonic acids, and greater or lesser amounts of undesirable phenolic bodies or phenolic sulphonic acids from which it is troublesome to separate the alpha-alpha-disulphonic acids in a pure state.

It has also been proposed to sulphonate anthraquinone in the presence of mercury or its compounds with oleum containing a relatively low percentage content of free sulfuric anhydride, e. g., about 20 to 29% free sulfuric anhydride, but such sulphonation has produced chiefly the anthraquinone-alpha-monosulphonic acid together with small and varying amounts of anthraquinone-alpha-alpha-disulphonic acids, while a considerable part of the anthraquinone has remained unsulphonated. It has also been proposed to subject the anthraquinone-monosulphonic acid in the presence of mercury or its compounds to sulphonation with oleum containing a comparatively high percentage content of free sulfuric anhydride, e. g., about 40% free sulfuric anhydride, to produce the alpha-alpha-disulphonic acids therefrom.

We have now found that anthraquinone can be substantially completely sulphonated to the disulphonic acid by treating it, in the presence of mercury or its compounds, with a sufficient amount of oleum, (that is, fuming sulphuric acid) containing a relatively low percentage of free sulfuric anhydride, for example, oleum containing about 15 to 30% of free sulphuric anhydride, and that the resulting sulphonation mixture consists for the greater part of anthraquinone 1.5 and 1.8 disulphonic acids, there being present, if any, only relatively small proportions of the isomeric alpha-beta- and beta-beta-disulphonic acids, anthraquinone-monosulphonic acid, and phenolic bodies or phenolic sulphonic acids.

According to the persent invention, we use oleum containing a relatiely low percentage of free sulfuric anhydride and in sufficient quantity so that the total amount of free sulfuric anhydride is equal to or somewhat greater than the amount required for the disulphonation of the anthraquinone.

While the oleum can be added progressively or in successive amounts, we find it of advantage to add all or practically all of the oleum at the outset, although small additional amounts may be added near the end of the process to complete the sulphonation.

In carrying out the invention, the anthraquinone is advantageously admixed initially with the oleum containing about 15 to 30 percent, preferably about 24–26 percent, of free sulfuric anhydride, and in the presence of mercury or its compounds, and the admixture is heated to a temperature of about 140°–160° C., preferably to about 150–155° C., until substantially no unchanged anthraquinone is present as shown by a test portion of the mixture being completely soluble, or nearly so, in water. The amount of oleum employed is equal to or somewhat more, preferably an excess of about 5 to 10 percent, than that theoretically required to effect the disulphonation of the anthraquinone by the action of the free sulfuric anhydride present.

The alpha-alpha-disulphonic acids can be isolated from the sulphonation mass in any suitable and well known manner, as for example, by diluting the mass with water and adding potassium or sodium chloride to the solution, whereby the 1.5 and 1.8 disulphonic acid separate out as their potassium or sodium salts, particularly upon cooling the mixture and after standing for some time, and can be filtered off. They are substantially free from anthraquinone monosulphonic acid, alpha-beta and beta-beta disulphonic acids, and from phenolic bodies and their sulphonic acids. The quality of the anthraquinone-alpha-alpha-disulphonic acids thus produced is excellent and the yields are superior to those obtained by heretofore proposed methods, so far as we are aware.

The following specific example will further illustrate the invention, but it is understood that the invention is not limited thereto. The parts are by weight.

Example: 100 parts anthraquinone are added to about 325 parts of 26 percent oleum containing 2 parts mercurous sulfate. The mixture is heated quickly to a temperature of about 150°–155° C. and kept at this temperature until there is no unchanged anthraquinone present as shown by a test portion being completely soluble, or nearly so, in water. Substantially complete solution, or nearly so, is usually obtained upon sulphonation at this temperature for about 25–35 minutes. If the product is not completely soluble, or nearly so, in water at the end of this time, a small amount of additional 26 percent oleum is added, and the heating is continued for a few minutes longer or until a test portion shows substantially complete solution of the product. When the sulphonation is complete, the melt is added to about 2000–2100 parts water, about 500–550 parts common salt are then added, and the mixture cooled to about 15° C., with stirring. After standing for about 12–15 hours the precipitated mixture of sodium salts is filtered off and washed with salt solution. The product as thus obtained consists chiefly of a mixture of the sodium salts of anthraquinone 1.5 and 1.8 disulphonic acids and is substantially free from anthraquinone monosulphonic acid, and from alpha-beta and beta-beta disulphonic acids, and from phenolic bodies or their sulphonic acids. The quality of the product is excellent and the yield is superior to that obtained by heretofore proposed processes. If desired, the 1.5 and 1.8 disulpho-acids or their sodium salts can be separated from each other in any suitable and well known manner.

If, in the above example, the sulphonation is carried out at the same temperature but with an equivalent amount of an oleum weaker than 26 percent, for example, a 20 percent oleum, the time required to complete the sulphonation will usually be somewhat longer.

It is to be noted that the present invention makes it possible to completely sulphonate anthraquinone in the presence of mercury or its compounds and obtain anthroquinone-alpha-alpha-disulphonic acids in superior yields and in an excellent state of purity by the use of oleum containing 15 to 30 percent free sulfuric anhydride as the sulphonating agent. An oleum of this strength is much more readily handled, it being a liquid at ordinary temperatures, than an oleum of 40 to 44 percent strength, the latter being a solid at ordinary temperatures. Moreover, the weaker oleum is less costly and this gives an economic advantage to the invention. Further, the invention produces less by-products and somewhat larger yields than prior processes.

In the claims it will be understood that the term "mercury" includes mercury and its compounds, such as mercurous and mercuric salts, mercurous or mercuric oxide, etc.

We claim:

1. The improvement in the sulphonation of anthraquinone to form anthraquinone 1.5 and 1.8 disulphonic acids which comprises subjecting anthraquinone, in the presence of mercury, to sulphonation at a temperature of about 140–160° C. with oleum containing about 24–26 percent free sulfuric anhydride, the amount of oleum employed being sufficient to disulphonate all of the anthraquinone with the free sulfuric anhydride present, and heating the mixture until the sulphonation mass is substantially completely soluble in water.

2. In the production of anthraquinone-alpha-alpha-disulphonic acids by heating an admixture of anthraquinone, mercury and oleum containing about 15 to 30 per cent free sulfuric anhydride, the steps which comprise employing an amount of said oleum at least sufficient to furnish enough sulfuric anhydride to completely sulphonate the anthraquinone to the disulphonic acid, heating the admixture to a temperature of about 140° to 160° C., and maintaining said temperature until the sulphonation mass is substantially completely soluble in water.

3. In the production of anthraquinone 1.5 and 1.8 disulphonic acids by sulphonating anthraquinone, in the presence of mercury, the steps characterized by treating anthraquinone with oleum containing about 15 to 30 percent free sulfuric anhydride, the amount of sulfuric anhydride employed being sufficient to completely sulphonate the anthraquinone to form the disulphonic acid, and causing the sulphonation to take place at a temperature of about 150–155° C.

4. The process of manufacturing anthraquinone 1.5 and 1.8 disulphonic acids which comprises treating anthraquinone, in the presence of mercury, with an amount of oleum containing at least sufficient free sulfuric anhydride to form anthraquinone disulphonic acid, the initial strength of the oleum being such that it contains about 24–26 percent free sulfuric anhydride, and at a temperature of about 150°–155° C. until the sulphonation mixture is substantially completely soluble in water, and subsequently adding the mixture to water, salting out the anthraquinone 1.5 and 1.8 disulphonic acids as their sodium salts from the solution by adding common salt thereto and removing the precipitated sodium salts by filtration.

5. The method of sulphonating anthraquinone which comprises adding 100 parts anthraquinone to about 325 parts of 24-26 percent oleum containing about two parts mercurous sulfate, heating the mixture to a temperature of about 150°-155° C., and maintaining it at this temperature until the sulphonation mixture is substantially completely soluble in water.

In testimony whereof we affix our signatures.

DONALD G. ROGERS.
HAROLD T. STOWELL.